(12) United States Patent
Hobbis

(10) Patent No.: US 6,760,589 B1
(45) Date of Patent: Jul. 6, 2004

(54) METHOD AND APPARATUS FOR STREAMLINING IN A COMMUNICATION SYSTEM

(75) Inventor: Kevan Hobbis, Swindon (GB)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/762,836
(22) PCT Filed: Aug. 9, 1999
(86) PCT No.: PCT/EP99/05766
 § 371 (c)(1),
 (2), (4) Date: Apr. 6, 2001
(87) PCT Pub. No.: WO00/11901
 PCT Pub. Date: Mar. 2, 2000

(30) Foreign Application Priority Data

Aug. 19, 1998 (GB) .............................. 9817936

(51) Int. Cl.[7] .................................................. H04Q 7/20
(52) U.S. Cl. ...................... 455/443; 455/432.1; 455/524
(58) Field of Search .............................. 455/432.1, 436, 455/438, 439, 524, 525, 443; 370/331, 332

(56) References Cited

U.S. PATENT DOCUMENTS

| 5,537,610 A | * 7/1996 | Mauger et al. ........... 455/435.3 |
| 6,009,326 A | * 12/1999 | Roder et al. ................. 455/436 |
| 6,397,065 B1 | * 5/2002 | Huusko et al. .......... 455/435.2 |
| 6,556,844 B1 | * 4/2003 | Mayer ........................ 455/560 |

* cited by examiner

Primary Examiner—Nguyen T. Vo
Assistant Examiner—Nhan T Le

(57) ABSTRACT

The invention relates to a method of and apparatus streamlining in a communication system with a separate core network (201) and access network (203). The access network comprises at least two access systems (205, 207) receiving a plurality of data streams which are combined before being routed to the core network (201). The streamlining is performed by setting up a connection from a second radio access system to the core network in parallel to the current connection from a first radio access system followed by combining the received data streams into two combined data streams and simultaneously routing one data stream through each of the two parallel connections. The core network will then switch from the first to the second connection and the first connection is subsequently terminated. The invention is applicable but not limited to the Universal Mobile Telecommunication System (UMTS) currently under development.

24 Claims, 3 Drawing Sheets

METHOD AND APPARATUS FOR STREAMLINING IN A COMMUNICATION SYSTEM

FIELD OF THE INVENTION

The present invention relates to a method and apparatus for streamlining in a communication system with a core network and an access network receiving a plurality of data streams from a subscriber unit. The invention is applicable but not limited to a cellular mobile radio communication system such as the Universal Mobile Telecommunication System (UMTS) currently under standardisation.

BACKGROUND OF THE INVENTION

In a cellular mobile communication system, such as for example the Global System for Mobile communication (GSM) or the Universal Mobile Telecommunication System (UMTS), each of the subscriber units communicate with typically a fixed base station. Communication from the subscriber unit to the base station is known as uplink and communication from the base station to the subscriber unit is known as downlink. The total coverage area of the system is divided into a number of separate cells each covered by a single base station. The cells are typically geographically distinct with an overlapping coverage area with neighbouring cells. As a subscriber unit moves from the coverage area of one cell to the coverage area of another cell, the communication link will change from being between the subscriber unit and the base station of the first cell to being between the subscriber unit and the base station of the second cell. This is known as a handover. Specifically, some cells may lie completely within the coverage of other larger cells.

All base stations are interconnected by a network. This network comprises communication lines, switches, interfaces to other communication networks, various controllers required for operating the network and the base stations themselves. A call from a subscriber unit is routed through the network to the destination specific for this call. If the call is between two subscriber units of the same communication system the call will be routed through the network to the base station of the cell in which the other subscriber unit is currently located. A connection is thus established between the two serving cells through the network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

In some communication systems, such as the Universal Mobile Telecommunication System (UMTS) currently under development, the network is split into a core network and an access network.

The core network comprises the necessary switching and interfaces to serving networks such as the PSTN, the Internet, other cellular systems (e.g. between GSM and UMTS), mobile station register entities (such as the Home Location Register and Visitors Location Register used in GSM). The core network would ideally require no knowledge of the technology (e.g. radio interface) used in the access network.

In the case of a cellular mobile communication system, the access network comprises those elements specific to a particular radio interface e.g. mobiles stations, the base stations used to transmit and receive the radio signals from the mobile stations, and the controllers used to route the calls between base stations and the core network.

Typically, the access network will comprise a plurality of access systems with different access nodes. An access system typically comprise an access controller controlling a number of access node where each access node comprises one or more base stations and possibly one or more site controllers controlling a number of base stations.

In for example a cellular radio communication system, the subscriber unit can typically for at least part of the time be received by more than one radio receiver. In some communication systems such as the Wideband Code Division Multiple Access (WCDMA) system defined for UMTS, the signal from the subscriber unit may simultaneously be demodulated in a plurality of these receivers. A number of received data streams representing the same data stream transmitted from the subscriber unit will thus be generated either in the same access node or possibly in a plurality of access nodes. A typical example where a plurality of parallel data streams from the same subscriber unit are generated in different access nodes is during handover when the subscriber unit is moving from one cell with one access node to a different cell with a different access node. In order to attain optimum performance, the parallel data streams generated are combined into a single data stream representing the transmitted data stream from the subscriber unit. One methods of combining data streams include Maximum Ratio Combining or Selection Combining, the last method simply consisting in selecting the data stream with the lowest error rate. Combining data streams from more than one access node during handover is known as a soft handover. Further description can be found in for example 'Spread Spectrum CDMA Systems for Wireless Communications' by Savo Glisic & Branka Vucetic, Artech House Publishers, 1997, ISBN 0-89006-858-5.

Combining the plurality of data streams into a single data stream is typically done in the access network before the single data stream is routed through a connection to the core network. The optimal routing of the data streams within the access network and to the core network will vary depending on which access nodes are receiving data streams from the subscriber unit. In most cellular mobile communication systems the cost of routing data through the network is very significant. Typically, the optimal routing is therefore given as the routing of the data streams which incurs the lowest cost. Alternatively, it could be the routing resulting in the lowest delay or the lowest bandwidth consumption.

As the subscriber unit moves between different cells and thus different access nodes the optimal routing and the optimal access point for connection to the core network will change. It is therefore necessary to change the routing in the access network and the access point to the core network as the subscriber unit moves. This is known as streamlining.

If the streamlining is inefficient, it can result in significantly increased cost for example due to increased bandwidth requirements of the access network. Also an inefficient streamlining can result in interruptions in the data stream and thus cause interruptions in the communication from the subscriber unit.

A significant advantage can thus be obtained from an efficient streamlining in a system with a core network and an access network with a plurality of access systems.

SUMMARY OF THE INVENTION

The invention seeks to provide a system for performing efficient streamlining in a communication system with a core network and an access network with a plurality of access systems.

According to a first aspect of the invention, there is provided a method of streamlining in a communication system with a core network, an access network with at least a first and a second access system and at least one subscriber unit. At least one of the first and second access systems generates a plurality of data streams from a signal received from the subscriber unit, the plurality of data streams being combined to a first combined data stream in the first or second access system and the first combined data stream being transmitted to the core network through a first connection between the first access system and the core network. The method comprising the steps of: setting up a second connection from the second access system to the core network in parallel to the first connection, combining a first subset of the plurality of data streams into a second combined data stream and a second subset of the plurality of data streams into a third combined data stream and simultaneously routing the second combined data stream to the core network through the first connection and routing the third combined data stream to the core network through the second connection, switching from the first connection to the second connection in the core network, and terminating the first connection.

Preferably the method includes the step of combining the first subset of the plurality of data streams with the third combined signal after switching to the second connection in the core network and preferably the first subset of the plurality of data streams contains the data streams received by the first access system and the second subset of the plurality of data streams contains the data streams received by the second access system.

According to a feature of the invention, the communication system is a CDMA cellular radio communication system and the access network is a CDMA radio access network.

According to a different aspect of the invention there is provided, an apparatus for streamlining in a communication system with a core network, an access network with at least a first and a second access system and at least one subscriber unit. At least one of the first and second access systems generates a plurality of data streams from a signal received from the subscriber unit, the plurality of data streams being combined to a first combined data stream in the first or second access system and the first combined data stream being transmitted to the core network through a first connection between the first access system and the core network. The apparatus comprising: means for setting up a second connection from the second access system to the core network in parallel to the first connection, means for combining a first subset of the plurality of data streams into a second combined data stream and a second subset of the plurality of data streams into a third combined data stream and simultaneously routing the second combined data stream to the core network through the first connection and routing the third combined data stream to the core network through the second connection, means for switching from the first connection to the second connection in the core network, and means for terminating the first connection.

BRIEF DESCRIPTION OF THE DRAWINGS

An embodiment of the present invention is described below, by way of example only, with reference to the accompanying drawing, in which.

DESCRIPTION OF A PREFERRED EMBODIMENT

Figure 1:
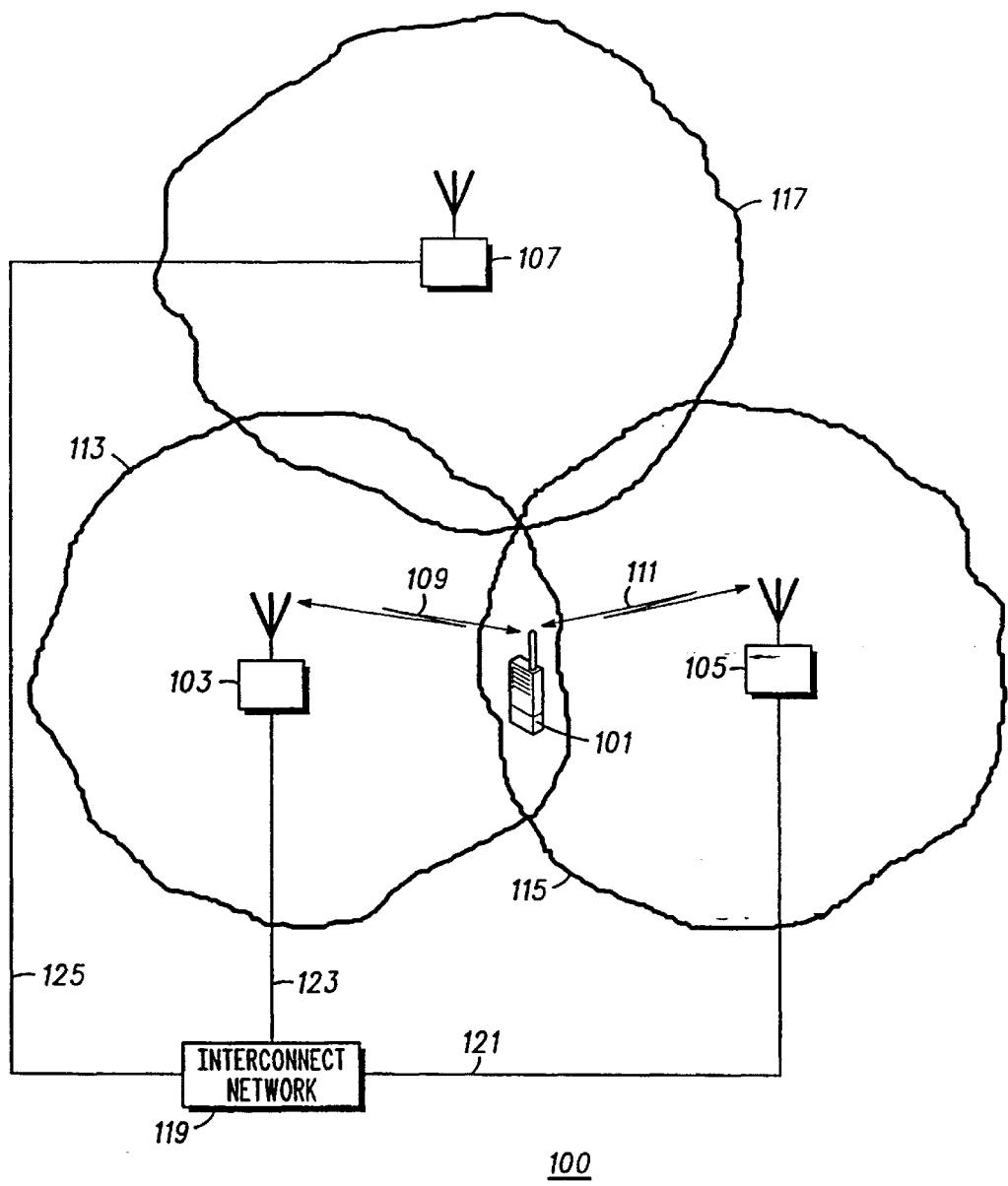
FIG. 1 is a diagram of a communication system to which this invention is applicable.

FIG. 1 illustrates a mobile cellular communication system. In the system, a subscriber unit 101, here specifically a mobile station, communicates with base stations 103,105, 107. In the specific embodiment the communication between base stations 103,105 and the subscriber unit 101 is over radio channels 109,111. In the cellular system, the base station 103 covers users within a certain geographical area 113 whereas other geographical areas 115, 117 are covered by other base stations 105, 107. In the shown example, the subscriber unit is located in the overlap between cell 113 and 115 and the signal transmitted by the subscriber unit 101 can be received by both base station 103 and base station 105.

Data transmitted by the subscriber unit 101 is received and demodulated in the base stations 103 and 105. In each base station 103 and 105, at least one data stream is generated. In order to attain optimum performance these data streams must be combined into a single data stream. Typically each base station is sectorised which means that radio signals from different directions are received independently. A radio signal from a subscriber may be reflected by objects and may therefore reach the base station from different directions. Each base station may thus generate more than one data stream and these data streams can be combined in the base station or elsewhere in the communication system.

Each base station is connected to an interconnecting network 119 through connections 121,123,125. The interconnecting network 119 together with the base stations 103,105,107 make up the network which routes the data from the source to the destination.

Reception of a plurality of data streams which are subsequently combined is known specifically in Code Division Multiple Access (CDMA) communication systems. It is known in some of these systems to combine data streams from a plurality of base stations during a handover from one base station to another. This is known as a soft handover. Further description of CDMA and combining of multiple data streams can be found in for example 'Spread Spectrum CDMA Systems for Wireless Communications' by Savo Glisic & Branka Vucetic, Artech House Publishers, 1997, ISBN 0-89006-858-5.

Figure 2:
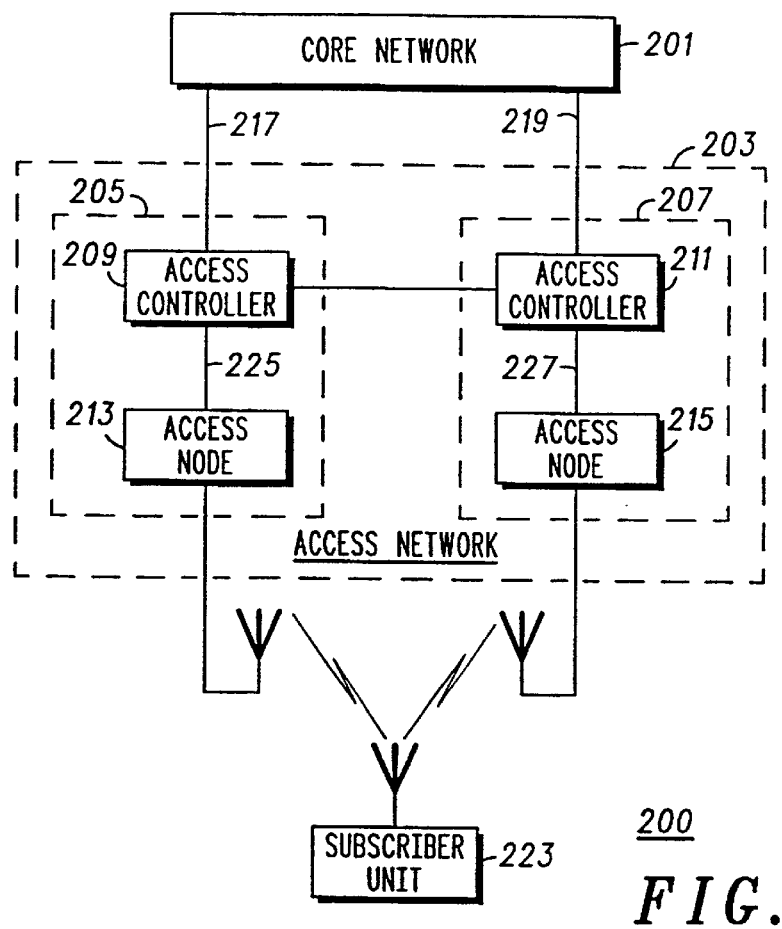
FIG. 2 is a block diagram of a network to which this invention is applicable.

FIG. 2 illustrates a network 200 for a communication system in which the invention can be embodied. The network 200 comprises a core network 201 and an access network 203. The access network comprises a plurality of access systems 205,207 comprising at least an access controller 209,211 and one or more access nodes 213, 215. The access controllers 209, 211 can route data streams through to the core network through connections 217 or 219.

The access nodes 213, 215 comprise at least one base station but can also comprise a plurality of base stations and possibly a site controller for controlling a plurality of base stations. Each base station receiving the signal from the subscriber unit 223 will generate at least one data stream. The data streams generated by different base stations or different sectors in the same base station can for example be combined in one of the base stations or in a site controller. Depending on which base stations receive the signal and the network connections within the access node 213,215, the access node will generate one or more data streams.

The example shown in FIG. 2 corresponds to a hierarchical network where each access node can only route data streams to their corresponding access controller. The access controllers 209,211 of different access systems can route data streams directly between them through a direct connection 221.

The subscriber unit 223 transmits a signal which is received by the access nodes 213, 215. The data streams generated by the access nodes 213, 215 are combined to a single data stream before being routed through to the core network from the access network. The combining of the data streams from the access nodes can be performed anywhere in the access network. Conventionally, each call thus has a single connection set up between the access network and the core network and only a single combined data stream is routed through this connection.

A specific example of a communication system as described is the Universal Mobile Telecommunication System (UMTS) which is currently under standardisation by the European Telecommunication Standards Institute (ETSI). In this system, the term 'Node B' corresponds to an access node, the access network is known as the UMTS Terrestrial Radio Access Network (UTRAN), the term 'Core Network' is used for the core network whereas the subscriber unit is known as a mobile station. Furthermore in UMTS, an access controller is known as a Radio Network Controller (RNC) and specifically the RNC currently supporting the connection to the core network is known as the Serving RNC (SRNC, corresponds to the first access controller 209 of the example) whereas the RNC towards which the subscriber unit is moving is known as the Drift RNC (DRNC, corresponds to the second access controller 211 of the example).

A communication from a given subscriber unit 223 is routed to the core network through a given connection. As the subscriber unit moves, it may be beneficial to modify the routing so the data stream from the subscriber unit is routed to the core network through a different connection. As an example of this streamlining process, a subscriber unit may initially be so close to an access node 213 that the radio signal can only be received by this access node 213. It will therefore be beneficial to combine the data streams in the access node 213 route it directly to the corresponding access controller 209 and through a connection 217 from the access controller 209 to the core network 201. If the subscriber unit subsequently moves close to a different access node 215 so no other access nodes can receive the radio signal (including the previously serving access node 213), the data streams can be combined in this access node 215. However, in order to use the connection set up for the call, the combined data stream must be routed to the second access controller 211 and from there through a connection 221 to the first access controller 209 which has the connection to the core network 201. It is thus preferable to streamline the network by routing the data stream through a connection 219 from the second access controller 211 to the core network. This will remove the requirement for routing data through the connection 221 between the access controllers and thereby reduce routing costs.

Figure 3:
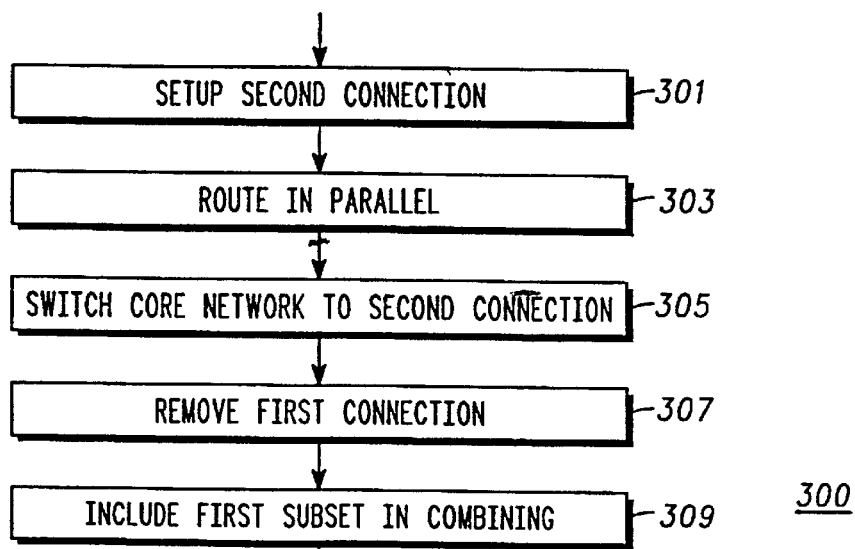
FIG. 3 is a flow chart of an embodiment of a streamlining method according to this invention.

According to the current invention a method of streamlining is provided. Before the streamlining procedure is begun, the data streams received by access node 213 are routed through a connection 225 to the first access controller 209. The data streams received by access node 215 are routed through a connection 227 to the second access controller 211. It is then routed from the second access controller 211 through a connection 221 to the first controller 209. The actual data streams routed can be the data streams received or can &be combined data streams obtained by combining some or all of the received data streams. This combining will typically be in the access controllers 209,211 but can also be in the access nodes 213,215. The first access controller 209 will combine the received data streams into a single combined data stream which is routed from the first access controller 209 to the core network 201 through a first connection 217. The streamlining process is described by the following steps as illustrated in the flowchart 300 of FIG. 3:

Step 301: A second connection 219 between the second access controller 211 and the core network 201 is created for the call from the subscriber unit 223. This connection is created in parallel to the existing connection 217 so that two connections are simultaneously available for routing data from the access network 203 to the core network 201 for the current call.

Step 303: A first subset of data streams are combined into a first single data stream for routing through the first connection 217 to the core network. The core network 201 is currently receiving this first single data stream and supporting the call on this data. Also a second subset of data streams are combined into a second single data stream for routing through to the core network through the second connection 219. At this stage, two data streams from the current call are thus routed through to the core network through two different connections.

Step 305: Within the core network 201, the switching of the current call is changed from the first connection 217 to the second connection 219. The core network thus at this stage routes the second single data stream through to the destination.

Step 307: The first connection 217 is no longer needed and is removed thereby freeing up resource in the network.

Preferably the method also includes the following step which can be carried out before, after or simultaneously with step 307:

Step 309: The first subset of data streams are routed to the second access controller 211 and combined with the data streams of the second subset.

The combining of the data streams can be performed in the access nodes, in the access controllers or can be located or distributed anywhere in the access network. The combining can also be performed sequentially where first some combined data streams are formed and subsequently these data streams are combined with other data streams which themselves can be combined data streams.

However, according to one feature of the invention, the first subset of data streams contains all the data streams received by the first access node 213 which is directly connected to the first access controller 209. Likewise the second subset of data streams contains all the data streams received by the access node 215 which is directly connected to the second access controller 211.

In one embodiment, the combining is performed in the access controllers 209, 211. In this embodiment, prior to streamlining, the data streams from the first access node 213 are routed from there directly to the first access controller 209. In the first access controller these data streams are combined into a first single data stream. Similarly, the data streams generated in the second access node 215 are routed directly to the second access controller 211 where there are combined into a second single data stream. This second single data stream is then routed to the first access controller 209 via connection 221 where it is combined with the first single data stream and the combined signal is routed through to the core network 201 through the first connection 217.

During step 303, the first single data stream formed in the first access controller 209 is routed from there directly to the core network 201 through the first connection 217. The second single data stream formed in the second access controller 211 is routed from there directly to the core network 201 through the second connection 219. During this step of the streamlining process there is thus no routing through the connection 221 between the two access controllers 209,211.

During step 309, the first single data stream formed in the first access controller 209 is routed directly to the second access controller 211 via connection 221 where it is combined with the second single data stream and the combined data stream is routed through to the core network 201 through the second connection 219.

Typically as the subscriber unit 223 moves further into the cell associated with the second access node 215, it will move further away from the cell associated with the first access node 213. At some point the first access node 213 will not be able to receive the signals from the subscriber unit 213 and there will thus not be generated any data streams in the first access node 213. There will thus not be routing of data streams from the first access node 213 through either the connection 225 to the first access controller or the connection 221 between the two access controllers 209,211.

The streamlining process described thus significantly reduces the routing requirements while allowing the core network to switch to the second connection 219 before terminating the first connection 217. This allows the streamlining process to implement a make before break connection thereby reducing the interruption in the data stream routed through to the destination.

In a specific embodiment, the first subset of data streams may be empty i.e. no data streams are routed through the first connection 217 to the core network during step 303. If for example combining is performed at the access nodes 213, 215 and no data streams are received by the first access node 213 only one data stream is routed through to the access controllers 209,211. In this case prior to streamlining the single data stream from access node 215 is routed through access controller 211 to access controller 209 and from there through to the core network 201 via the first connection 217. During step 303 the single data stream from access node 215 is routed through to access controller 211 and from there through to the core network 201 via the first connection 217. No data streams are routed through the first connection 217 during step 303. Step 303 and 305 can in this case be carried out in reverse order or preferably in parallel. In this embodiment an interruption in the data stream will result.

Alternatively, in a situation where no data streams are received by the first access node 213, the data streams received by access node 215 can be distributed between the first and second connection 217, 219 during step 303. If for example combining is performed in the access controller 211, this will prior to streamlining combine all data streams from the second access controller 215 and route the combined data stream to the first access controller. During step 303 the data streams from the second access controller will in this embodiment be separated into the first and second subset of data stream with one subset being routed through the first access controller 209 and the first connection 217 to the core network 201, whereas the other subset is combined and routed through to the core network 201 through the second connection 211. The first subset of data streams can be combined in either the first or second access controller 209,211. After the core network 201 has switched to the second connection 219 all data streams will be combined into a single data stream, which is routed through the second connection 219. This embodiment allows an uninterrupted data stream to be routed through to the destination by the core network.

Figure 4:
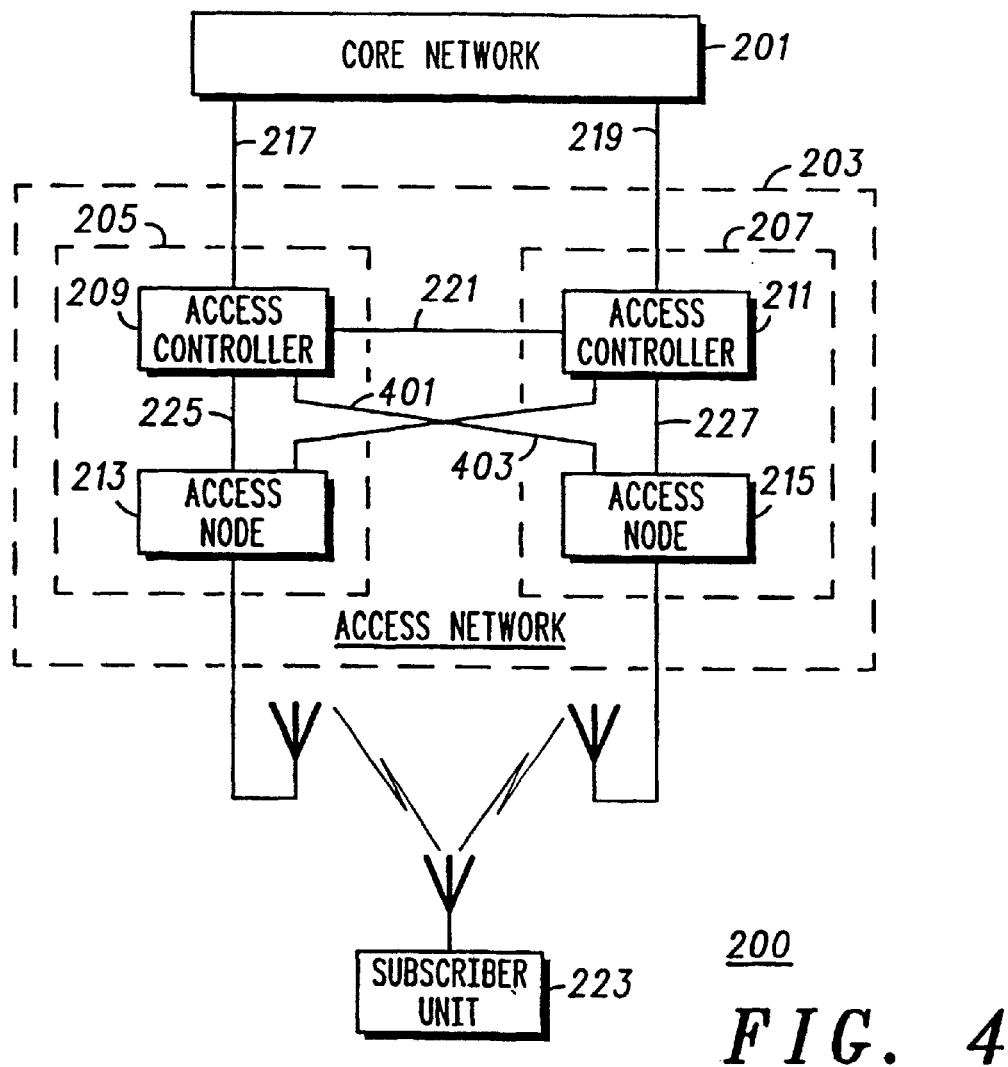
FIG. 4 is a block diagram of a peer to peer network to which this invention is applicable.

In a different embodiment, the access network is not a hierarchical network but is a peer to peer network. In a peer to peer network all nodes are connected to each other. A block schematic 400 of an example of a peer to peer access network is illustrated in FIG. 4. The shown example is identical to the hierarchical network illustrated in FIG. 2 except there is a direct connection 401 between the first access node 213 and the second access controller 211 and a direct connection 403 between the second access node 215 and the first access controller 209. The connections between the access nodes and access controllers are not necessarily physical connections but can be logical connections and specifically the peer to peer network can be a packet switched network.

In this embodiment, the routing from the first access node 213 to the second access controller 211 will be directly through the connection 401 rather than through the first access controller 209. Likewise the routing from the second access node 215 to the first access controller 209 will be directly through the connection 403 rather than through the second access controller 211.

It will be apparent to the person skilled in the art that the invention is not limited to two access systems, access nodes or access controllers but can be extended to any number. Thus streamlining involving data streams received by three or more access nodes and/or involving three or more connections to the core network can be envisaged.

It will also be apparent to the person skilled in the art that the invention is not limited to cellular mobile communication systems but can be applied to a variety of communication systems incorporating a core network and an access network, including satellite communication systems and wireless local loop applications.

What is claimed is:

1. A method of streamlining in a communication system with a core network, an access network with at least a first and a second access system and at least one subscriber unit, at least one of the first and second access systems generating a plurality of data streams from a signal received from the subscriber unit, the plurality of data streams being combined to a first combined data stream in the first or second access system and the first combined data stream being transmitted to the core network through a first connection between the first access system and the core network, the method comprising the steps of:

setting up a second connection from the second access system to the core network in parallel to the first connection, combining a first subset of the plurality of data streams into a second combined data stream and a second subset of the plurality of data streams into a third combined data stream and simultaneously routing the second combined data stream to the core network through the first connection and routing the third combined data stream to the core network through the second connection, switching from the first connection to the second connection in the core network, and terminating the first connection.

2. A method of streamlining as claimed in claim 1 further comprising the step of combining the first subset of the plurality of data streams with the third combined signal after switching to the second connection in the core network.

3. A method of streamlining as claimed in any of the preceding claims 1 or 2 wherein the first subset of the plurality of data streams contains the data stream received by the first access system and the second subset of the plurality of data streams contains the data streams received by the second access system.

4. A method of streamlining as claimed in claim 1 wherein the access network is a peer to peer network.

5. A method of streamlining as claimed in claim 4 wherein said first access system includes a first access node and a first access controller and said second access system includes a second access node and a second access controller, wherein the first subset of the plurality of data streams are routed through direct logical connections from the first or second access node to the first access controller and the second subset of the plurality of data streams are routed through direct logical connections from the first or second access node to the second access controller during streamlining, and further comprising the steps of prior to initiating the streamlining, routing the data streams received by the first access node through a direct logical connection from the first access node to the first access controller and the data streams received by the second access node through a logical connection from the second access node to the first access controller, and after switching to the second connection in the core network routing the data streams received by the first access node through a direct logical connection from the first access node to the second access controller and the data steams received by the second access node through a logical connection from the second access node to the second access controller.

6. A method of streamlining as claimed in claim 1 wherein the access network is a hierarchical network.

7. A method of streamlining as claimed in claim 6 wherein said first access system includes a first access node and a first access controller and said second access system includes a second access node and a second access controller, and wherein during streamlining the data streams in the first subset of the plurality of data streams received by the first access node are routed through a connection from the first access node to the first access controller, the data streams in the first subset of the plurality of data streams received by the second access node are routed through a connection from the second access node to the second access controller and then through a connection from the second access controller to the first access controller, the data streams in the second subset of the plurality of data streams received by the second access node are routed through a connection from the second access node to the second access controller, and the data streams in the second subset of the plurality of data streams received by the first access node are routed through a connection from the first access node to the first access controller and then through a connection from the first access controller to the second access controller, and the method fixer comprising the steps of prior to initiating the streamlining, routing the data streams received by the first access node through a direct connection from the first access node to the first access controller and the data streams received by the second access node through a connection from the second access node to the second access controller and through a connection from the second access controller to the first access controller, and after switching to the second connection in the core network routing the data streams received by the first access node through a connection from the first access node to the first access controller and through a connection from the first access controller to the second access controller, and the data streams received by the second access node through a connection from the second access node to the second access controller.

8. A method of streamlining as claimed in claim 1 to wherein said first access system includes a first access node and a first access controller and said second access system includes a second access node and a second access controller, and wherein data streams received by the first access node are combined in the first access node before being routed to the first or second access controller.

9. A method of streamlining as claimed in claim 1 wherein said first access system includes a first access node and a first access controller and said second access system includes a second access node and a second access controller, and wherein the data streams received by the second access node are combined in the second access node before being routed to the first or second access controller.

10. A method of streamlining as claimed in claim 1 wherein said first access system includes a first access node and a first access controller and said second access system includes a second access node and a second access controller, and wherein combining of data streams is in the first and/or second access controller.

11. A method of streamlining as claimed in claim 1 wherein the communication system is a radio communication system and the access network is a radio access network.

12. A method of streamlining as claimed in claim 11 wherein the communication system is a Code Division Multiple Access system.

13. A method of streamlining as claimed in claim 11 wherein the communication system is a cellular mobile communication system.

14. An apparatus for streamlining in a communication system with a core network, an access network with at least a first and a second access system and at least one subscriber unit, at least one of the fist and second access system generating a plurality of data streams from a signal received from the subscriber unit, the plurality of data streams being combined to a first combined data stream in the first or second access system and the first combined data stream being transmitted to the core network through a first connection between the first access system and the core network, the apparats comprising means for setting up a second connection from the second access system to the core network in parallel to the first connection, means for combining a first subset of the plurality of data streams into a second combined data stream and a second subset of the plurality of data streams into a third combined data stream and simultaneously routing the second combined data stream to the core network through the first connection and routing the third combined data steam to the core network through the second connection, means for switching from the first connection to the second connection in the core network, and means for terminating the first connection.

15. An apparatus for streamlining as claimed in claim 14 further comprising means for combining the first subset of the plurality of data streams with the third combined signal after switching to the second connection in the core network.

16. An apparatus for streamlining as claimed in any of the preceding claims 14 or 15 wherein the first subset of the plurality of data streams contains the data streams received by the first access system and the second subset of the plurality of data streams contains the data streams received by the second access system.

17. An apparatus for streamlining as claimed in claim 14 wherein the access network is a peer to peer network.

18. An apparatus for streamlining as claimed in claim 14 wherein the access network is a hierarchical network.

19. An apparatus for streamlining as claimed in claim 14 wherein said first access system includes a first access node and a first access controller and said second access system includes a second access node and a second access controller, and data streams received by the first access node are combined in the fist access node before being routed to the first or second access controller.

20. An apparatus for streamlining as claimed in claim 14 wherein said first access system includes a first access node and a first access controller and said second access system includes a second access node and a second access controller, and the data streams received by the second access node are combined in the second access node before being routed to the first or second access controller.

21. An apparatus for streamlining as claimed in claim 14 wherein said first access system includes a first access node and a first access controller and said second access system includes a second access node and a second access controller, and combining of data streams is in the first and/or second access controller.

22. An apparatus for streamlining as claimed in claim 14 wherein the communication system is a radio communication system and the access network is a radio access network.

23. An apparatus for streamlining as claimed in claim 22 wherein the communication system is a Code Division Multiple Access system.

24. An apparatus for streamlining as claimed in claim 22 wherein the communication system is a cellular mobile communication system.

* * * * *